(12) United States Patent
Richardson et al.

(10) Patent No.: US 8,179,366 B2
(45) Date of Patent: *May 15, 2012

(54) SYSTEMS AND METHODS FOR USING A MOVABLE OBJECT TO CONTROL A COMPUTER

(75) Inventors: Jim Richardson, Philomath, OR (US); Birch Zimmer, Corvallis, OR (US); Eric Wesley Davison, Portland, OR (US)

(73) Assignee: NaturalPoint, Inc., Corvallis, OR (US)

( * ) Notice: Subject to any disclaimer, the term of this patent is extended or adjusted under 35 U.S.C. 154(b) by 826 days.

This patent is subject to a terminal disclaimer.

(21) Appl. No.: 11/296,731

(22) Filed: Dec. 6, 2005

(65) Prior Publication Data

US 2006/0119576 A1 Jun. 8, 2006

Related U.S. Application Data

(60) Provisional application No. 60/633,833, filed on Dec. 6, 2004, provisional application No. 60/633,839, filed on Dec. 6, 2004.

(51) Int. Cl.
*G09G 5/00* (2006.01)
*G06F 19/00* (2011.01)
*G06F 3/00* (2006.01)
*G06F 3/048* (2006.01)

(52) U.S. Cl. ............. 345/156; 345/7; 345/8; 702/94; 715/705; 715/706; 715/756

(58) Field of Classification Search .......... 345/156–184, 345/4–9; 715/705–706, 710–711, 716, 756–757; 702/94–97; 708/94–97

See application file for complete search history.

(56) References Cited

U.S. PATENT DOCUMENTS

| | | | | |
|---|---|---|---|---|
| 5,991,085 | A * | 11/1999 | Rallison et al. | 359/630 |
| 5,999,185 | A * | 12/1999 | Kato et al. | 345/420 |
| 6,009,210 | A * | 12/1999 | Kang | 382/276 |
| 6,580,810 | B1 * | 6/2003 | Yang et al. | 382/103 |
| 6,714,661 | B2 * | 3/2004 | Buddenmeier et al. | 382/103 |
| 7,042,440 | B2 * | 5/2006 | Pryor et al. | 345/158 |
| 7,091,948 | B2 * | 8/2006 | Chang et al. | 345/156 |
| 2002/0151337 | A1 * | 10/2002 | Yamashita et al. | 463/8 |
| 2003/0040361 | A1 * | 2/2003 | Thorner | 463/36 |
| 2005/0059488 | A1 * | 3/2005 | Larsen et al. | 463/36 |
| 2005/0116925 | A1 * | 6/2005 | Gombert et al. | 345/156 |
| 2005/0253806 | A1 * | 11/2005 | Liberty et al. | 345/156 |
| 2006/0119575 | A1 * | 6/2006 | Richardson et al. | 345/156 |
| 2006/0152434 | A1 * | 7/2006 | Sauer et al. | 345/8 |
| 2007/0003915 | A1 * | 1/2007 | Templeman | 434/247 |

OTHER PUBLICATIONS

Cordea et al ("3D Head Pose Recovery for Interactive Virtual Reality Avatars", Instrumentation and Measurement Technology Conference, 2001. IMTC 2001. Proceedings of the 18th IEEE).*

(Continued)

*Primary Examiner* — Bipin Shalwala
*Assistant Examiner* — Matthew Fry
(74) *Attorney, Agent, or Firm* — Alleman Hall McCoy Russell & Tuttle LLP

(57) ABSTRACT

A system and method for controlling operation of a computer based on movements and/or position of a movable object. The system includes a sensing apparatus configured to obtain positional data based on movements of a sensed object. Engine software may process the positional data and generate control commands to produce a virtual position in an application running on the computer. A visual comparator is operatively coupled with the engine software and configured to display an actual indicator and a virtual indicator to provide a visual comparison between the virtual position and the actual position of the sensed object.

29 Claims, 8 Drawing Sheets

OTHER PUBLICATIONS

Simon Meers, et al. "Simple, Robust and Accurate Head-Pose Tracking Using a Single Camera." 2006. Faculty of Informatics—Papers, University of Wollongong, 2006. http://ro.uow.edu.au/infopapers/434 (2006), 13 pages.

* cited by examiner

SYSTEMS AND METHODS FOR USING A MOVABLE OBJECT TO CONTROL A COMPUTER

CROSS REFERENCE TO RELATED APPLICATIONS

The present application claims priority to Provisional Application Ser. No. 60/633,833, filed Dec. 6, 2004, titled "Position Sensing Apparatus and Software, Systems and Methods for Using a Movable Object to Control a Computer" and to Provisional Application Ser. No. 60/633,839, filed Dec. 6, 2004, titled "Position Sensing Apparatus and Software, Systems and Methods for Using a Movable Object to Control a Computer", the entire contents of each of which are incorporated herein by this reference in their entirety and for all purposes.

TECHNICAL FIELD

The present description relates to systems and methods for using a movable object to control a computer.

DETAILED DESCRIPTION

The present description is directed to software, hardware, systems and methods for controlling a computer (e.g., controlling computer hardware, firmware, a software application running on a computer, etc.) based on the real-world movements of an operator's body or other external object. The description is broadly applicable, although the examples discussed herein are primarily directed to control based on movements of a user's head, as detected by a computer-based position sensing system. More particularly, many of the examples herein relate to using sensed head movements to control a virtual reality software program, and still more particularly, to control display of virtual reality scenes in a "fishtank VR" type application, such as a game used to simulate piloting of an airplane, or other game or software that provides a "first person" view of a computerized scene.

Figure 1:
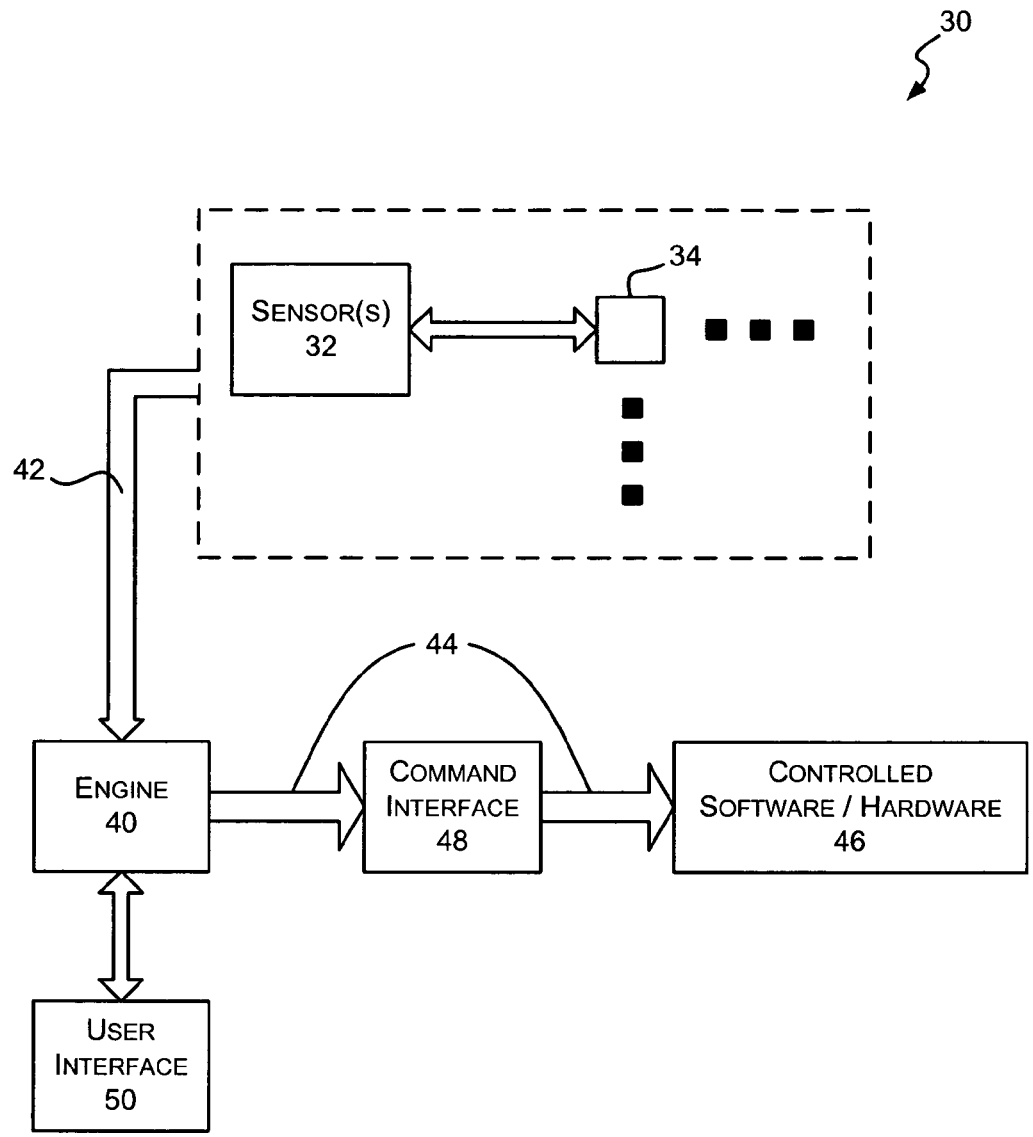
FIG. 1 is a schematic block diagram depiction of a system for controlling a computer based on position and/or movement of a movable object.

FIG. 1 schematically depicts a motion-based control system 30 according to the present description. A sensing apparatus, such as sensor or sensors 32, is responsive to, and configured to detect, movements of one or more sensed locations 34, relative to a reference location or locations. According to one example, the sensing apparatus is disposed or positioned in a fixed location (e.g., a camera or other optical sensing apparatus mounted to a display monitor of a desktop computer). In this example, the sensing apparatus may be configured to sense the position of one or more sensed locations on a sensed object (e.g., features on a user's body, such as reflectors positioned at desired locations on the user's head).

According to another embodiment, the sensing apparatus is positioned on the sensed object. For example, in the setting discussed above, the camera (in some embodiments, an infrared camera may be employed) may be secured to the user's head, with the camera being used to sense the relative position of the camera and a fixed sensed location, such as a reflector secured to a desktop computer monitor. Furthermore, multiple sensors and sensed locations may be employed, on the moving object and/or at the reference location(s).

In the above example embodiments, position sensing may be used to effect control over rendered scenes or other images displayed on a display monitor positioned away from the user, such as a conventional desktop computer monitor or laptop computer display. In addition to or instead of such an arrangement, the computer display may be worn by the user, for example in a goggle type display apparatus that is worn by the user. In this case, the sensor and sensed locations may be positioned either on the user's body (e.g., on the head) or in a remote location. For example, the goggle display and camera (e.g., an infrared camera) may be affixed to the user's head, with the camera configured to sense relative position between the camera and a sensed location elsewhere (e.g., a reflective sensed location positioned a few feet away from the user). Alternatively, a camera or other sensing apparatus may be positioned away from the user and configured to track/sense one or more sensed locations on the user's body. These sensed locations may be on the goggle display, affixed to some other portion of the user's head. etc.

Sensing apparatus 32 typically is operatively coupled with engine software 40, which receives and acts upon position signals or positional data 42 received from sensing apparatus 32. Engine software 40 receives these signals and, in turn, generates control signals 44 which are applied to effect control over controlled software/hardware 46 (e.g., a flight simulation program), which may also be referred to as the "object" or "objective of control." Various additional features and functionality may be provided by user interface 50, as described below.

The object of control may take a wide variety of forms. As discussed above, the object of control may be a first person virtual reality program, in which position sensing is used to control presentation of first person virtual reality scenes to the user (e.g., on a display). Additionally, or alternatively, rendering of other scenes (i.e., other than first person scenes) may be controlled in response to position. Also, a wide variety of other hardware and/or software control may be based on the position sensing, other than just rendering of imagery.

Continuing with FIG. 1, in some embodiments, the various depicted components may be provided by different vendors. Accordingly, in order to efficiently facilitate interoperability, it may be desirable to employ components such as command interface 48, to serve as translators or intermediaries between various components. Assume, for example, that the object of control is a video game that has been available for many years, with an established set of control commands that control panning/movement of scenes and other aspects of the program. Assume further that it was originally intended that these control commands be received from a keyboard and mouse of a desktop computer. To employ the motion control described herein with such a system, it may be desirable to develop an intermediary, such as command interface 48, rather than performing a significant modification to engine software 40. The intermediary would function to translate the output of engine software 40 into commands that could be recognized and used by the video game. In many embodiments, the design of such an intermediary would be less complex than the design of engine 40, allowing the motion control system to be more readily tailored to a wide range of existing games/programs.

The functionality and interrelationship of the above components may be readily understood in the context of an aviation simulation software program. Typically, aviation simulators include a first person display or other rendered scene of the airplane cockpit, along with views through the cockpit windows of the environment outside the simulated airplane. An exemplary configuration of the described system may be employed as follows in this context: (1) an infrared camera may be mounted to the computer display monitor, and generally aimed toward the user's head; (2) the camera may be configured to detect and be responsive to movements of various sensed locations on the user's head, such as reflective spots affixed to the user's head, recognizable facial features, etc.; (3) the raw positional data obtained by the camera would be applied to engine software 40 (e.g., in the form of signals 42), which in turn would produce control signals that are applied to controlled software/hardware 46, which in this case would be the software that generates the rendered scenes presented to the user, i.e., the actual flight simulator software.

In this example, the flight simulator software and motion-control system may be supplied by different vendors/developers, as discussed above In the case of a third-party developer of the position sensing apparatus and engine software, the engine software would be specially adapted to the particular requirements of the controlled software. For example, a given flight simulator program may have a standard set of tasks that are performed (e.g., move the depicted virtual reality scene to simulate translation and rotation). The engine software would be adapted in this case to convert or translate the raw positional data into the various tasks that are performed by the flight simulator program. For example, movement of the sensed object in a first direction may correlate with task A of the flight simulator; movement of the sensed object in a second direction with task B, etc. Typically, in implementations of a virtual reality program such as a flight simulator, movements of the user's head would be used to control corresponding changes in the cockpit view presented to the user, to create a simulation in which it appears to the user that they are actually sitting in a cockpit of an airplane. For example, the user would rotate their head to the left to look out the left cockpit window, to the right to look out the right cockpit window, downward to look directly at a lower part of the depicted instrument panel, etc.

Figure 2:
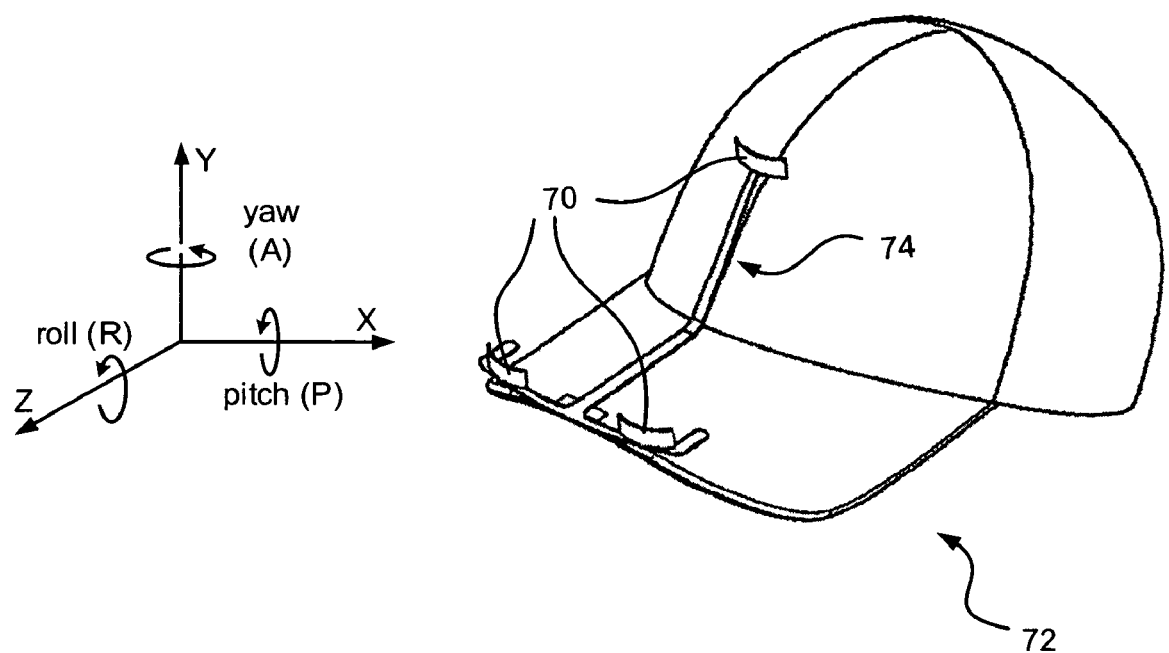
FIG. 2 depicts a frame of reference and an apparatus for affixing sensed locations to a user's head, to enable tracking of movements of the user's head.

FIG. 2 depicts an example in which sensed locations or reflective members 70 are disposed on a cap 72 to be worn by the user. As shown in the figure, the reflective spots are provided on a member 74 which may be clipped to a brim of the cap. Any desired number of reflective locations may be employed. In the present example, three reflective locations are used. The location of the reflective spots relative to a fixed location may be determined using an infrared camera. The use of reflective spots and an infrared camera is exemplary only—other types of cameras and sensing may be employed. Indeed, for some applications, non-optical motion/position sensing may be employed in addition to or instead of cameras or other optical methods.

Figure 3:
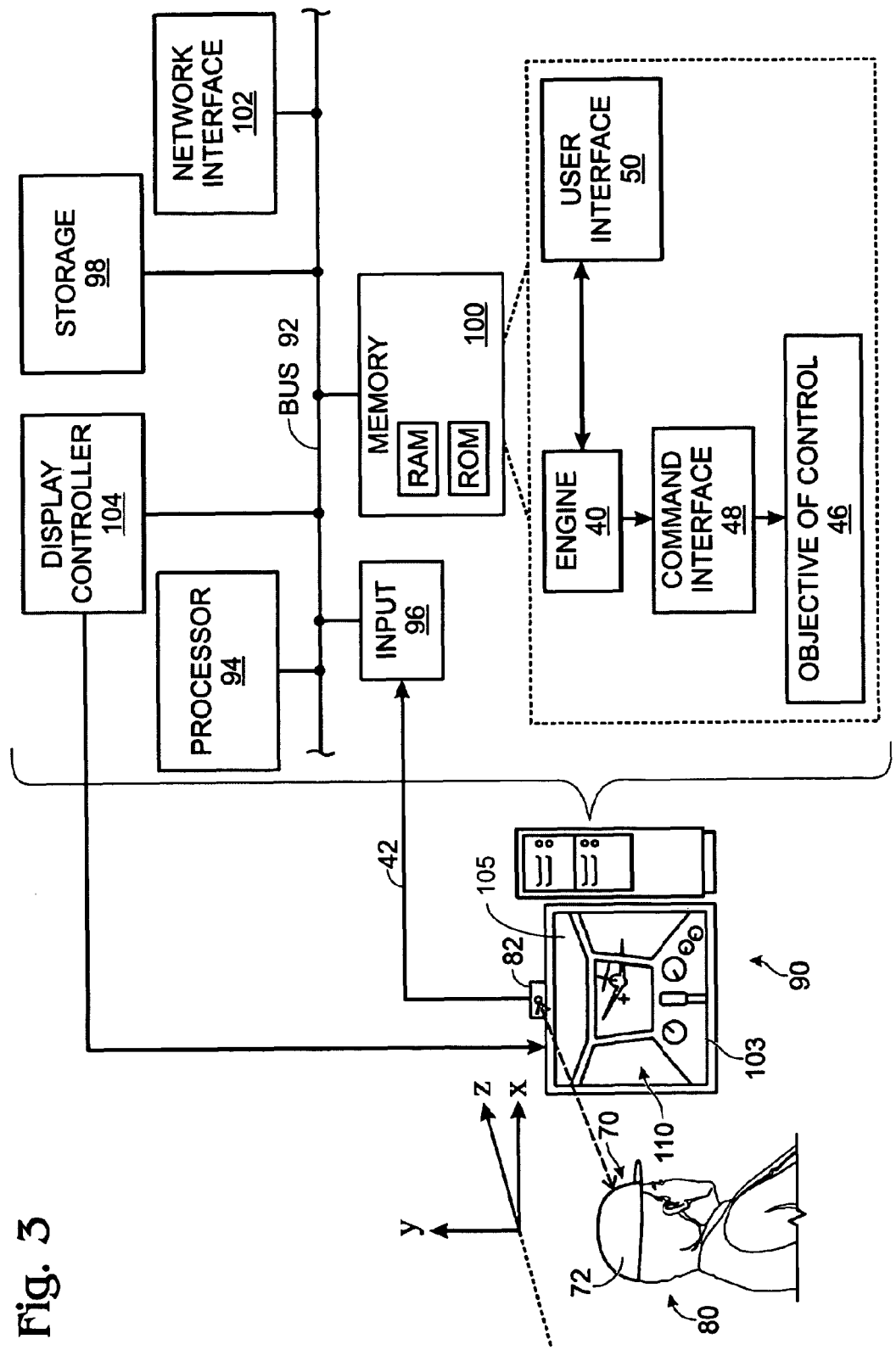
FIG. 3 is a schematic depiction of another system for controlling a computer based on position and/or movement of a movable object.

In the present example, the camera may be mounted to a display monitor of the computer that is to be controlled. The positional data received by the camera is received into the engine software, which may be executed within a memory location of the computer to be controlled. FIG. 3 also shows sensed locations 70 and cap 72, and depicts the physical relationship between the sensed object (e.g., the user's head 80) and the sensing apparatus (e.g., infrared camera 82), and further provides a schematic depiction of the engine software and computer to be controlled based on movements of the sensed object. In FIG. 3, and in other examples discussed herein, the motion sensing methods and systems may be used to control presentation of a rendered scene 110 to the user. FIG. 3 depicts a desktop monitor 103 displaying the rendered scene, though it will be appreciated that other types of displays may be employed, including the goggle apparatus discussed above.

Any type of computer may be employed in connection with the present description. The computer may include some or all of the components of the exemplary computing device depicted schematically in FIG. 3. Specifically, computer 90 may include various components interconnected via a bus 92 or similar mechanism, such as a processor 94, input peripherals 96, storage 98, memory 100, network interface 102, etc. In the present example, the display monitor 103 to which camera 82 is affixed is driven by the display controller 104. Camera 82 serves as an input peripheral, in that it receives external positional data and applies it to the computer for processing. In many embodiments, a position sensing apparatus such as a camera will be one of many input devices. Other input devices may include a mouse, keyboard, etc. In the depicted example, the positional data is received into engine software 40 (e.g., from camera 82 via input 96 and bus 92), which may be executed within memory 100. The engine software, in turn, processes the positional data in order to effect control over some other part of the computer. In the present example, controlled software 46 is controlled at least in part by the engine software. As indicated, the controlled software may also be executed within the memory of the computer. The controlled software may be a flight simulator program or other type of virtual reality software program. In the present example, position sensing is used to control presentation of displayed images 105, which may be first person virtual reality scenes or other rendered images.

Referring again to FIG. 2, the figure also depicts a frame of reference that may be used to describe translational and rotational movement of the user's head or other sensed object. Assuming an infrared camera mounted on top of a computer display, assume the Z axis represents translation of the user's head linearly toward or away from the computer display point of reference. The X axis would then represent horizontal movement of the head relative to the reference, and the Y axis would correspond to vertical movement. Rotation of the head about the X axis is referred to as "pitch" or P rotation; rotation about the Y axis is referred to as "yaw" or A rotation; and rotation about the Z axis is referred to as "roll" or R rotation.

In embodiments such as that of FIG. 2, in which three sensed locations are employed, the positional data that is obtained (e.g., by the camera) may be represented within engine software 40 initially as three points within a plane. In other words, even though the sensed object (the user's head)

is translatable in three rectilinear directions and may also rotate about three rectilinear axes, the positions of the three sensed locations may be mapped into a two-dimensional coordinate space. As explained below, the position of the three points within the mapped two-dimensional space may be used to determine relative movements of the sensed object (e.g., a user's head in the above example).

Figure 4:
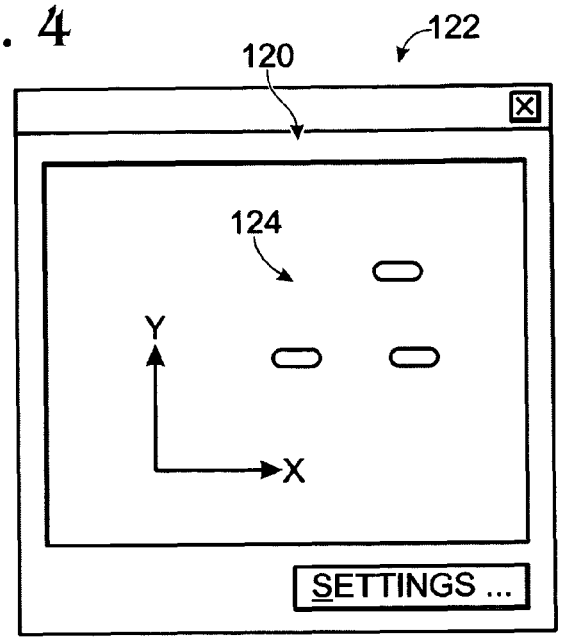
FIGS. 4 and 5 depict exemplary two dimensional mapping representations of the positions of three sensed locations of a movable object within three dimensional space.
Figure 5:
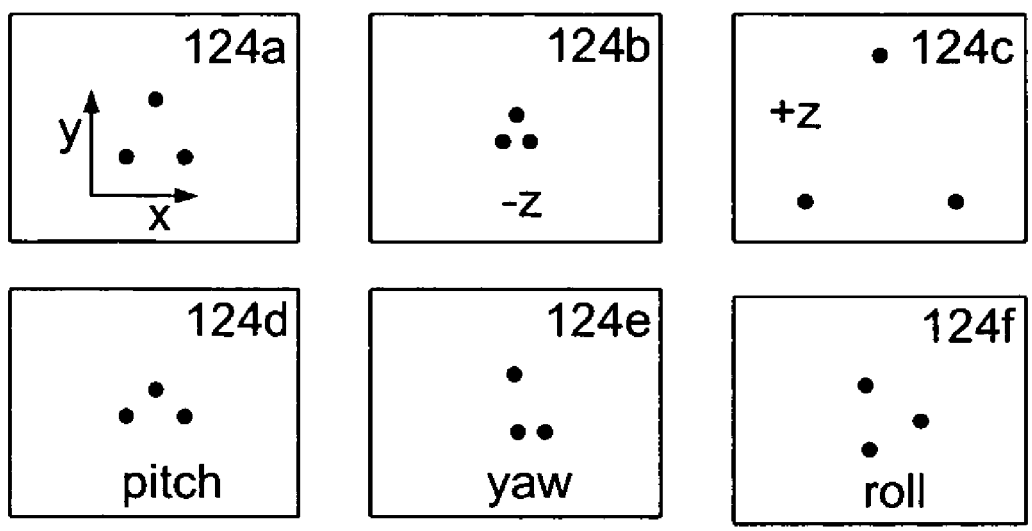

FIG. 4 depicts an exemplary screen shot 120 of a software embodiment 122 depicting a two-dimensional mapping 124 based on detection of three sensed locations on a sensed object. FIG. 5 depicts six different mappings to illustrate how movement in each of the six degrees of freedom (X, Y and Z axis translation, and rotation about the X, Y and Z axes) affects the two dimensional mapping 124. Referring first to the upper left mapping 124a, a neutral mapping is depicting, corresponding to a centered reference location of the sensed object and sensed locations. For example, this reference position may correspond to the user's head being in a centered position, relative to a camera mounted atop the display monitor, with the user more or less squarely facing the monitor. In this example, the computer monitor would be in the X-Y plane. Thus, translational movements of the user's head (and sensed locations) along the X and/or Y axes would result in the mapped spots shifting as indicated by the arrows in the upper left mapping. Various other movements are indicated in the other mappings of FIG. 5. Specifically, mapping 124b indicates negative Z-axis translation relative to the neutral position of mapping 124a; mapping 124c shows positive Z-axis translation; mapping 124d shows pitch rotation; mapping 124e shows yaw rotation; and mapping 124f shows roll rotation.

In some cases, it will be desirable to employ sensing methodologies and systems that result in certain indeterminacies in the raw positional data that is initially obtained. For example, in the above example, the two-dimensional mapping of the three sensor spots can yield multiple solutions when equations are applied to determine the position of the sensed object. This is partially due to the fact that, in the present example, the three sensor spots are not differentiated from each other within the mapping representation of the raw data. Referring, for example, to mapping 124a (FIG. 5), the mapping could correspond to three different rotational positions about the Z axis, each being roughly 120 degrees apart. Moreover, in the six-degrees-of-freedom system described herein, the described three-sensor approach can yield six solutions when certain computational methods are applied to the raw data.

The two-dimensional mapping may thus be thought of as a compressed data representation, in which certain data is not recorded or represented. This compression-type feature allows the system to be simpler, to operate at higher speeds under certain conditions, and to operate with fewer sensors. Accordingly, the system typically is less costly in terms of the processing resources required to drive the data acquisition functionality of the engine software 40.

Various methods may be employed to address these indeterminacies. For example, calculations used to derive actual movements from variations in the two-dimensional mapping may be seeded with assumptions about how the sensed object moves. For example, a user's head has a natural range of motion. From the neutral position described above (and using the same frame of reference), a human head typically can "yaw" rotate 90 degrees to either side of the neutral position. Similarly, typical range of head rotation is also approximately 180 degrees or less about each of the "pitch" and "roll" axes.

Thus in certain exemplary applications, it may be assumed that the user is upright and generally facing the display monitor, such that solutions not corresponding to such a position may be eliminated.

Furthermore, temporal considerations may be employed, recognizing that the human head moves in a relatively continuous motion, allowing recent (in time) data to be used to make assumptions about the movements producing subsequent data. Regardless of the specific methodology that is employed, the methods are used to rule out impossible (or improbable or prohibited or less probable) and thereby aid in deriving the actual position of the movable object. More generally, use of constraints may be employed with any type of movable object being sensed. Such techniques are applicable in any position sensing system where the data is compressed or represented in such a manner as to provide non-unique solutions.

The following are examples of empirical considerations that may be built into the described systems and methods to resolve the position of the sensed object:

1. Based on empirical observations of multiple users, it could be determined that a typical user takes time T to fully rotate their head (yaw rotation) through the full range of yaw rotation, which could be expressed in terms of an angular velocity. Thus, if the rotational position at time $t_0$ is known, a solution or solutions existing at time t1 could be ruled out if they correspond to a rotational change that would require rotation at an angular velocity greater than that which had been observed.
2. Solutions corresponding to unnatural or unlikely positions can be ruled out based on information (empirical or otherwise) about the range of motion of the sensed object.
3. Positional solutions may be ruled out based on current conditions associated with the controlled computer software/hardware. For example, in a flight simulator game, assume that the simulated plane is being taken through a landing sequence, and that the head position has been resolved down to two possible solutions. If one solution corresponds to the user looking at the landing runway, and another corresponds to the user looking out the left cockpit window, then, absent other information, the position corresponding to the user being focused on the landing task would be selected.

It should be appreciated that any combination of constraints, empirical information, contextual considerations, etc. may be employed to resolve ambiguities in the positional data.

It may be desirable in certain settings to employ additional sensed locations. For example, in the described example, if one of the three sensors were obstructed or otherwise unavailable, an alternate sensed location could be employed. Thus, the system may be configured so that any given time, the position is being sensed using three sensors, however, more than three sensed locations are available, in the event that one or more of the sensed locations is occluded or otherwise unavailable.

Figure 6:
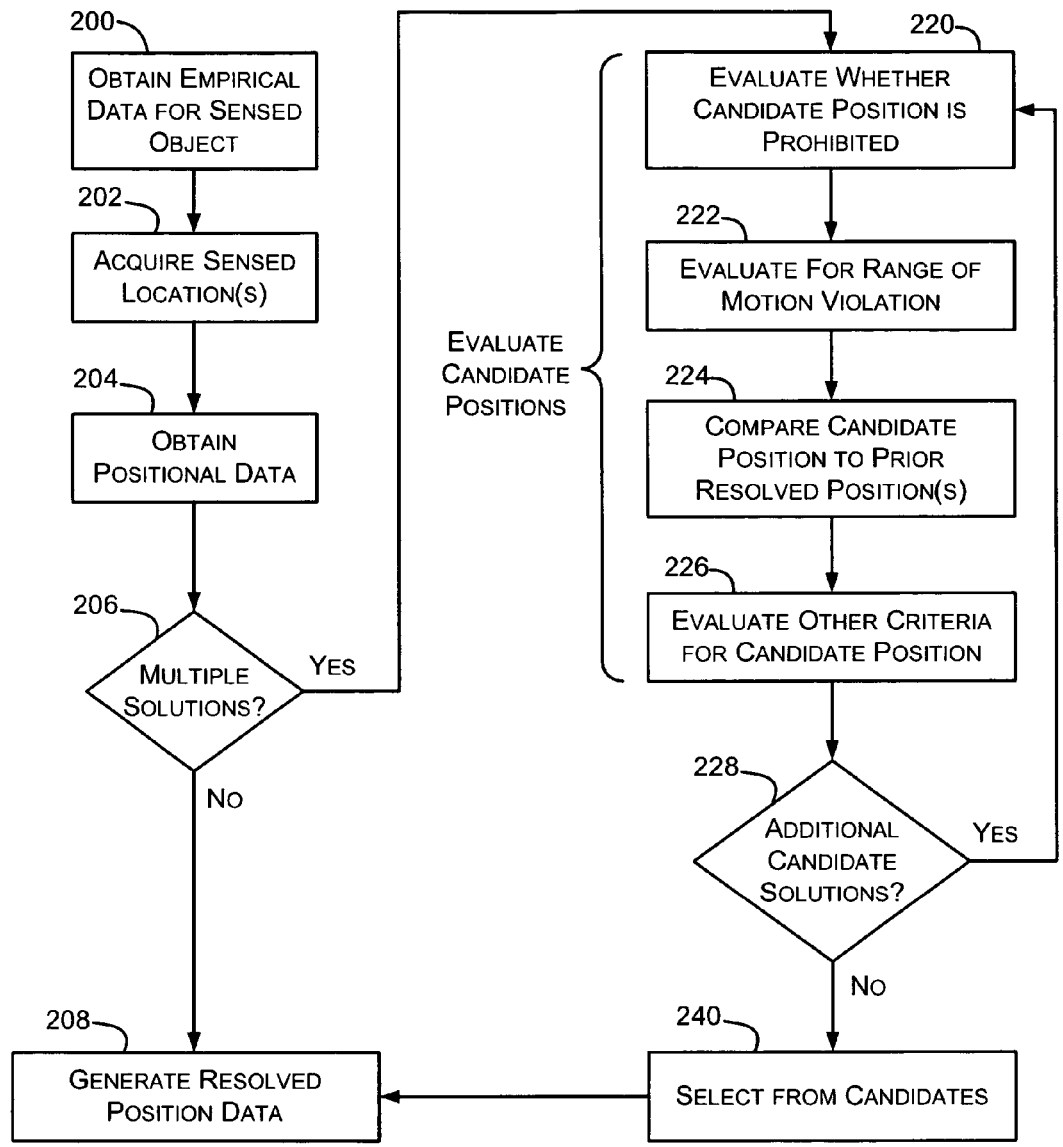
FIG. 6 depicts an exemplary method for processing positional data received from a position sensing apparatus, in order to generate commands for controlling a computer.

FIG. 6 depicts an exemplary method for resolving positional data. As shown at 200, the method may include acquiring data pertaining to the movable object which is to be sensed. This may occur during design of the system, during a setup routine performed by the user, during the course of normal operation, or at any other desirable or practicable time. The data may be empirically acquired and may include information about the range of motion of the movable object, about the velocity at which the object translates and/or rotates, positional probabilities, etc. With regard to positional probability, empirically acquired data may reveal that the object is in a first set or range of positions a relatively large percentage of the time, and that another set/range of positions, while occurring with some frequency, occur much less often than the positions of the first set. This information may aid in selecting between plural solutions. The above discussion is exemplary only—a wide variety of empirical information may be gathered to aid in resolving ambiguities in the positional data.

The method may also include, as shown at 202, acquiring a sensed location or locations. This may include various routines for verifying that the sensing apparatus is properly detecting the sensed locations, and/or for verifying that the proper number of sensed locations are available (e.g., that a sensed location is not occluded or obstructed). Accordingly, given the possibility in some settings of having an unavailable sensed location (e.g., due to obstruction), it may be desirable in some applications to provide redundancy or more sensed locations than is needed. For example, member 74 (FIG. 2) may be provided with an additional reflective spot, i.e., four reflectors instead of three. Continuing with this example, the method may thus include, in the event that one of the reflective spots is unavailable, acquiring an alternate reflector (the fourth, redundant reflector). Thus, even though a given system embodiment may be configured to employ X number of sensors (three in the present example), any practicable number of additional sensors may be employed in the event that one is unavailable (e.g., unobstructed, in a poor position, etc.).

Continuing with FIG. 6, the method may also include, at 204, acquiring the raw positional data. In the example of FIG. 3, camera 82 would sense the raw positional data and the data would be received into engine software 40. At 206, the method may include assessing whether the raw positional data yields multiple solutions, corresponding to different resolved positions for the movable object. If only one solution exists, the position is resolved (selected) as shown at 208.

If multiple solutions are present, the different candidate solutions may then be evaluated to resolve the positional data by selecting one of the multiple solutions. As indicated above, many methods may be employed to select from the multiple candidate solutions. According to one example, each candidate solution is evaluated using various criteria. As shown in the figure, a given candidate position may be evaluated to determine if it is prohibited (220), for example, via inclusion in a list of enumerated prohibitions or a range of prohibited positions. The candidate position may also be evaluated to see if it corresponds to a position that is outside the observed/permitted range of motion, or if the range of motion renders the positions highly unlikely, etc. (222). The candidate position may be compared to prior resolved positions (224), in order to yield temporal or other types of analyses. For example, given two possible candidate positions, it may be desirable to select the candidate that is closest to the most recent resolved position, particularly if only a short amount of time has passed since the last update, as it may be assumed that small positional changes are more likely to occur than large changes in a given time period. At 226, any other desirable/useful criteria may be assessed. If additional candidate solutions are present, a subsequent potential solution may then be evaluated, as shown at 228.

Once all the candidate positions have been evaluated, the method may include, as shown at 240, selecting from among the plural candidate positions in order to obtain a calculated, or resolved position upon which further control is based. Selection may be based on various combinations of the above assessments. Some candidates may be ruled out immediately during assessment (e.g., if a potential candidate solution represents a position that is impossible for the sensed object to achieve, or if a certain position is prohibited). Alternatively, it is possible that after all candidate positions have been assessed, multiple solutions still remain. In such a case, the assessment performed at one or more of the preceding assessments may be compared for different solutions in order to select the resolved solution. For example, the assessment may reveal that candidate A is much more likely to be the actual position then candidate B, and candidate A would therefore be selected as the resolved position. Preferences among multiple possibilities may be prioritized by scoring the various assessed parameters, or through other methods.

Note that the example control and method routines included herein can be used with various motion control configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, it should be appreciated that the method of selecting and employing one of multiple possible solutions is applicable to sensing apparatuses other than those employing a camera or other optical devices. Capacitors, gyroscope, accelerometers, etc. may be employed to perform the position sensing, for example. Also, it should be appreciated that the present systems and methods relating to resolving positional data are not limited to virtual reality video games, but are more widely applicable to any system in which the physical movements and/or position of an external object are used to control some aspect of a computer.

As previously discussed, position sensing systems have been employed to some extent in first person VR software applications. Typically, these VR applications seek to provide a one-to-one correspondence between actual movements and the simulated virtual movements. In other words, when the user rotates their body 90 degrees, the displayed virtual perspective within the game rotates by 90 degrees. This approach is common in VR games where displayed information is presented to the user via a "goggle-type" display that is mounted to the user's head.

By contrast, in implementations where actual and virtual movements are correlated, the present systems and methods typically employ actual-virtual movement relationships other than the one-to-one relationship described above. For example, in some configurations, rotational movements may be amplified or otherwise scaled, uniformly across the range of rotational motion, or as a function of rotational position, rotational velocity, etc. Such an approach is particularly useful when correlating actual and virtual movements of a head.

FIGS. 7A-7D provide an example of an environment in which scaling may be desirable. In a flight simulator, a non-scaled, non-amplified correlation between actual and virtual motion would require the user to rotate their head 90 degrees to the left to look squarely out the left-side virtual cockpit window. It would be difficult or impossible, however, for the user to keep their eyes on the computer display and see the displayed scene with their head rotated into that position. Accordingly, the figures show correlations 302, including non-scaled correlations, between the actual, real world position of a user's actual head 304 (on the left of the figures) and a corresponding position of a virtual head 306 in a first person software program, such as a fight simulator game.

The left side of each figure shows the actual head 304 of the user, in relation to a computer display monitor 308, which may display scenes from a flight simulator program. As previously discussed, a sensor such as a camera 310, may be mounted on the computer display or placed in another location, and is configured to track movements of the user's head.

The right side of each figure shows a schematic representation which describes a state of the flight simulator software. In each of the figures, a virtual head 306 is disposed within virtual cockpit 312, which includes a front window or windshield 314, side windows 316, back 318 and instrument panel 320. The depicted states are as follows: (1) FIGS. 7A and 7D: the virtual head is facing directly forward (0°), such that the flight simulator software displays (e.g., on display monitor 308) a scene of instrument panel 320 and a view out through front window 314; (2) FIG. 7C: the virtual head is rotated 90° from the position shown in FIGS. 7A and 7B, such that the simulator software displays the left side of cockpit 312 and a view out the left side window 316; (3) FIG. 7D: the virtual head is rotated 180° from the position shown in FIGS. 7A and 7B, such that the simulator software displays back 318 of cockpit 312.

It should be understood that the depictions on the right side of the figures may or may not form part of the material that is displayed to the user of the software. In the present discussion, the depictions to the right serve primarily to illustrate the first-person orientation within the virtual reality environment, to demonstrate the correspondence between positions of the user's head (i.e., head 304) the virtual reality scene that is displayed to the user on display 308. However, the depictions on the right side may form part of the content that is displayed to the user. Indeed as discussed below, it may in some cases be desirable to display content that illustrates the correlation between actual movements and virtual movements, to enable the user to better understand the correlation, and in further embodiments, to control/adjust the relationship between actual and virtual movements.

Figure 7A:
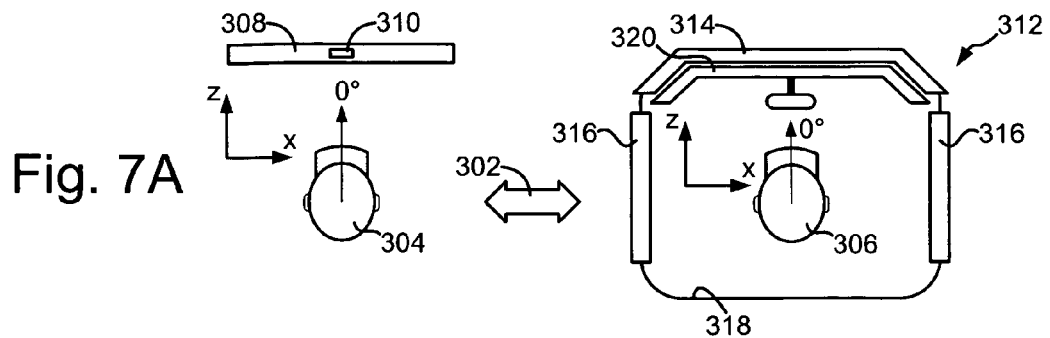
FIGS. 7A-7D depict various exemplary correlations between actual position of a movable object and a corresponding virtual position of a virtual object or rendered scene within a computer, such as within a virtual reality computer game.

Continuing with FIG. 7A, actual head 304 is depicted in a neutral, centered position relative to sensor 310 and display 308. The head is thus indicated as being in a 0° position (yaw rotation). As shown by correlation 302, the corresponding virtual position is also 0° of yaw rotation, such that the user is presented with a view of instrument panel 320 and a view looking through the front window 314 of cockpit 312. These scenes would be displayed on display 308.

Figure 7B:
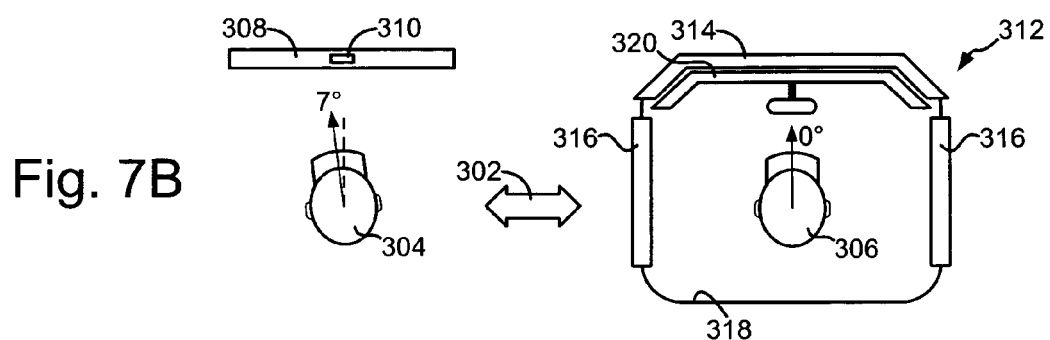

FIG. 7B illustrates a rotational dead zone, or a range of actual rotation that produces no corresponding change in position of the virtual head. Specifically, in the figure, actual head 304 has undergone 7° of yaw rotation, though virtual head 306 remains in the 0° yaw position, as it was in FIG. 7A when the actual head had not yet rotated out of the neutral position. It may be desirable to intentionally configure the system in this manner, such that certain actual movements (e.g., movements in a certain range of motion, rapid jerky movements, small positional changes, etc.) produce no change in the virtual position, and thus no change in the scene that is presented to the user on display 308. Dead spots may be configured in various ways. For example, the user may want very slight movements centered about a neutral position to have no effect. If every small rotation or bobble of the user's head directly correlated to virtual motion (e.g., no dead spot), small movements could cause the displayed scene to have undesirable jitter or wobble. The system may also be configured with other types of non-responsiveness, for example to not respond to very high frequency, small amplitude movements.

Figure 7C:
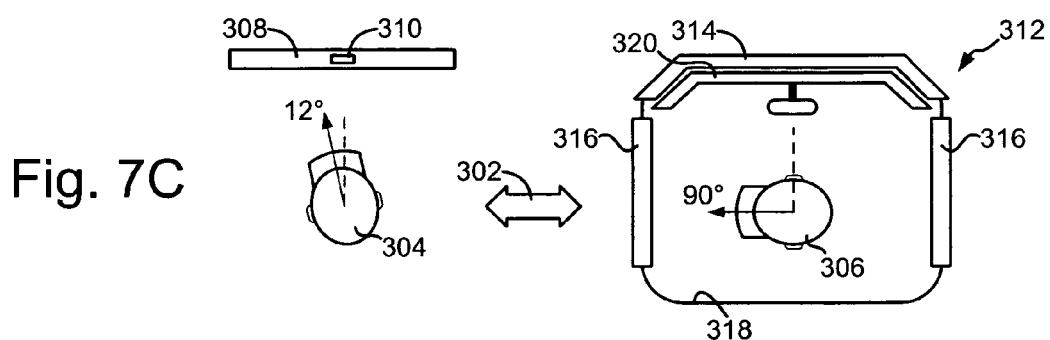
Figure 7D:
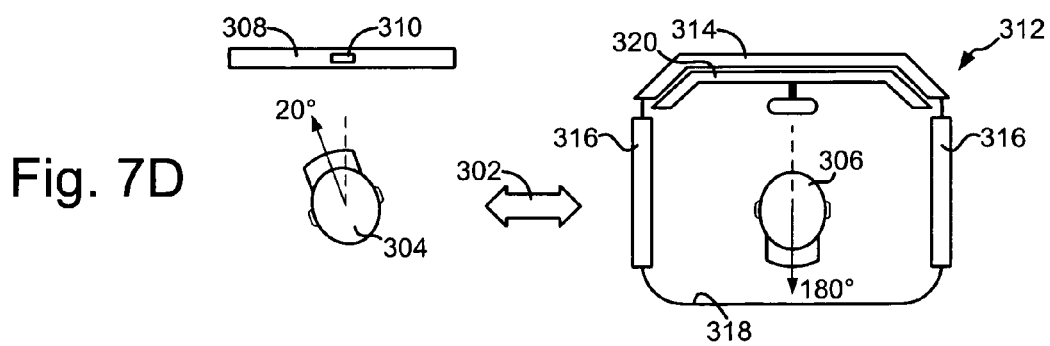

FIG. 7C depicts an upward scaling, or amplification, of yaw rotation. In a flight simulator, a non-scaled, non-amplified correlation between actual and virtual motion would require the user to rotate their head 90 degrees to the left to look squarely out the left-side virtual cockpit window. In this orientation, however, it would be difficult or impossible for the user to keep their eyes on computer display 308 to view the displayed scene. Accordingly, in the example of FIG. 7C, a 12° yaw rotation of actual head 304 has produced a corresponding 90° rotation in the virtual head, such that the user is presented (on display 308) with a scene looking out left side window 316 of virtual cockpit 312. In such a configuration, the user is able to rotate their head to the left (thus simulating the real-life motion that would be required to look to the left out a window) so as to produce a corresponding change in the depicted scene. Here, 12° of yaw rotation produces a 90° rotation of the displayed scene. FIG. 7D similarly depicts amplification of yaw rotation, in which 20° of yaw rotation produces a 180° rotation of the displayed virtual reality scene, allowing the user to view back 318 of simulated cockpit 312.

It will be appreciated that a wide variety of correlations may be employed between the actual movement and the control that is effected over the computer. In virtual movement settings, correlations may be scaled, linearly or non-linearly amplified, position-dependent, velocity-dependent, acceleration-dependent, etc. Furthermore, in a system with multiple degrees of freedom or types of movement, the correlations may be configured differently for each type of movement. For example, in the six-degrees-of-freedom system discussed above, the translational movements could be configured with deadspots, and the rotational movements could be configured to have no deadspots. Furthermore, the scaling or amplification could be different for each of the degrees of freedom.

Because the actual movement and virtual movement may be correlated in so many different ways, and for other reasons, it may be desirable to employ different methods and features to enable the user to more readily adjust the control commands produced by movements of the sensed object. Referring again to FIGS. 7A-7D, a legend such as that such in those figures may be employed. In typical configurations, user interface 50 (FIG. 3) would be configured to produce such a legend, though this feature may be included as part of engine software 40, controlled software/hardware 46, or any other software component.

The depictions shown in FIGS. 7A-7D may be employed to demonstrate to the user a side-by-side comparison showing the actual position of the sensed object (e.g., the user's head) and the control that is effected over the computer. In other words, referring to FIG. 7B, and to FIGS. 7C and 7D, the user is shown that relatively small yaw rotations (e.g., 7° or less) about a neutral position produce no corresponding movement, and further yaw rotation is amplified so that the user can rotate the virtual view 180° with relatively small yaw rotations of their head.

The software may thus be said to employ, in certain embodiments, an actual indicator and a virtual indicator, as respectively denoted by actual head 304 and virtual head 306 in the examples of FIGS. 7A-7D.

Figure 8:
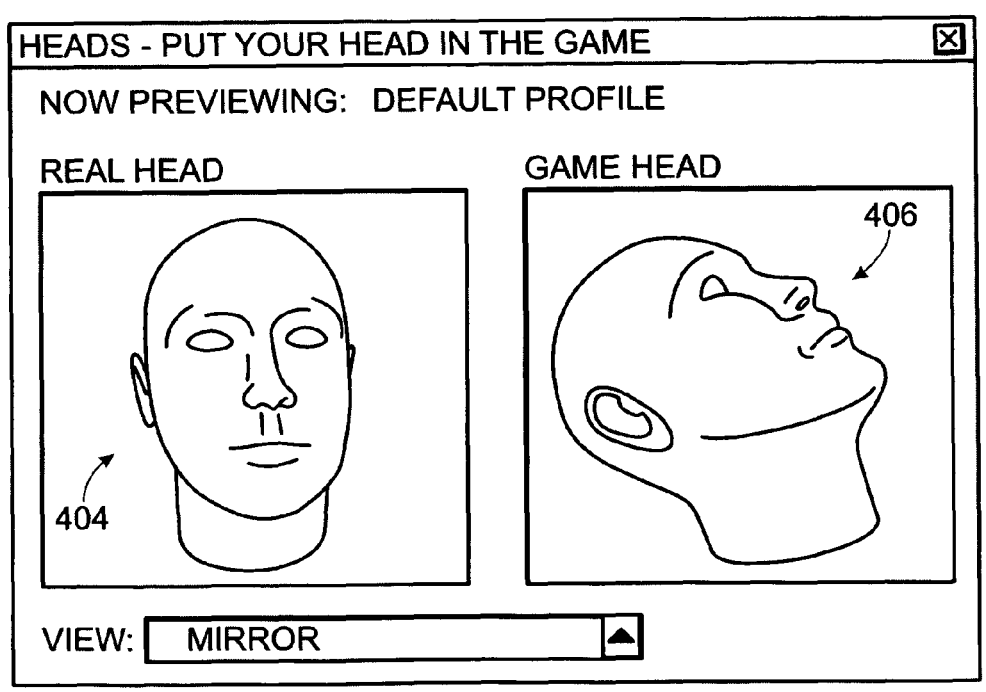
FIGS. 8-10 are exemplary screenshots and depictions of interface tools configured to enable a user to understand and adjust correlations between movement of a movable object and the resultant corresponding control that is exerted over a computer based on the movement.

FIG. 8 depicts a further example of a software component or feature that includes a visual comparator 402 including an actual indicator 404 and a virtual indicator 406. The figure continues with the previously-discussed example, in which movements of the user's actual head are sensed and produce a corresponding control of some virtual movement in the computer, such as movement of first-person virtual reality scenes displayed on monitor 308 (FIGS. 7A-7D). As shown, actual indicator 404 is a representation of the actual sensed position of the user's head, while virtual indicator 406 is a representation of the corresponding position of the virtual head. Accordingly, the displayed comparison would allow the user to easily ascertain what actual movement is required to rotate the virtual scene by 90°, 180°, etc.

Figure 9:
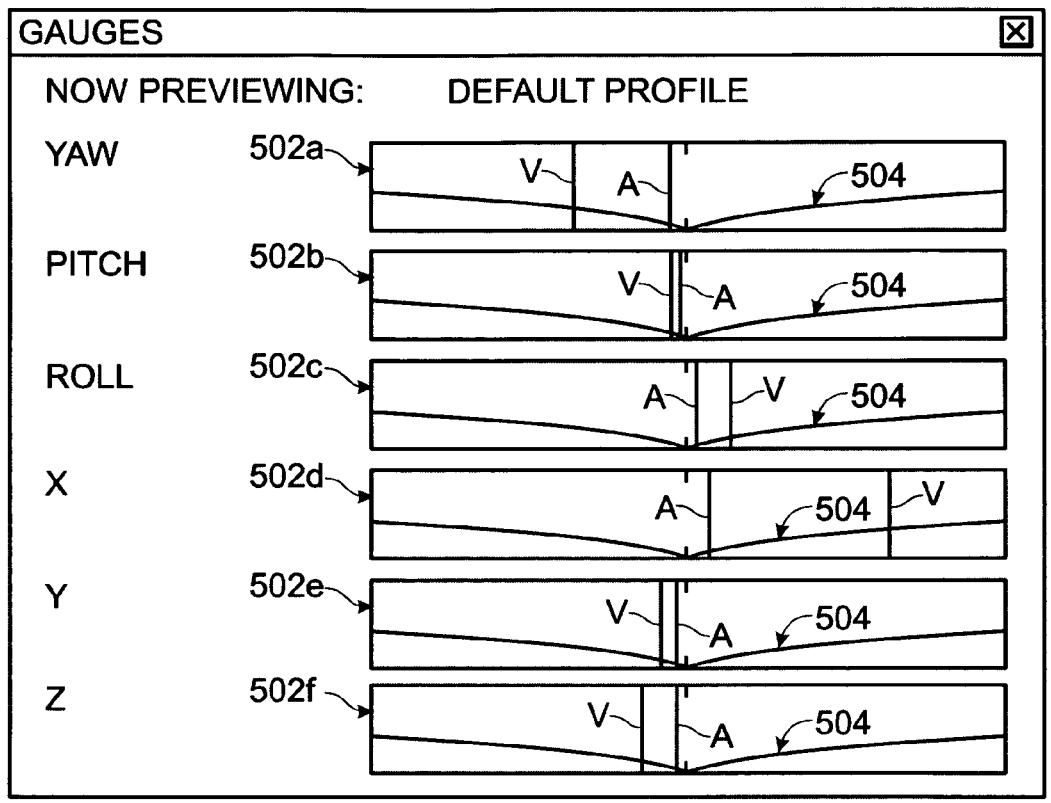

FIG. 9 provides a more detailed example showing of a visual comparator showing actual and virtual indicators. Specifically, the figure shows a motion plot 502 for each of six degrees of freedom: yaw (FIG. 502a), pitch (FIG. 502b) and roll (FIG. 502c) rotation; and X (FIG. 502d), Y (FIG. 502e) and Z (FIG. 502f) translation. For each of the rotation plots, positive or relative rotation (about a centered position) is shown for both the actual position of the sensed object and the resultant virtual position. The actual rotational position (e.g., of the user's head) is shown with actual indicator A, while the virtual position is shown with virtual indicator V. Furthermore, each plot may include a profile characteristic 504 (for clarity, indicated only on plot 502a), indicating amplification (or some other characteristic of the corresponding virtual control) as a function of the position of the actual object along the movement axis. Similar to FIGS. 7A-7D and 8, the motion plots provide actual and virtual indicators allowing the user to readily ascertain the effects produced by movement of the sensed object.

In addition to or instead of demonstrating the relationship between actual movement and the corresponding control, the actual and virtual indicators may be used to facilitate adjustment of the applied control.

Referring first to FIGS. 7A-7D, the systems and methods described herein may be configured to enable the user to manipulate the depictions of the figures in order to vary/adjust the relationship between the physical motion and resulting control. For example, the software may be placed into an adjustment or configuration mode, in which the user can manipulate the position(s) of actual head 304 and/or virtual head 306 to vary the run-time correlation between the two. More specifically, the user might rotate virtual head into the 180° position (FIG. 7D), and then move the actual head into a desired position. Then, for example, if the user wanted to rotate the virtual scene by 180° by turning their head 10°, they would turn actual head by 10°. Similar user manipulation may be performed with the actual and virtual indicators of FIGS. 8 and 9.

The exemplary systems and methods described herein may also be adapted to enable resetting or calibration of the control produced by the position and positional changes of the sensed object. For example, in head sensing embodiments, it may be desirable to enable the user to set or adjust the neutral position or frame of reference (e.g., the origin or reference position from which translational and rotational movements are measured). For example, through another input device (such as a mouse or button on a game controller), the user may activate a calibration feature (e.g., incorporated into user interface and/or engine 40) so that the actual frame of reference is mapped to the virtual frame of reference, based on the position of the user's head at that instant. This resetting function may be activated at startup, from time to time during operation of the system, etc. As indicated above, the function may be activated at any time via a user-actuated input. In another embodiment, a zero point may be established automatically. A combination of automatic and user-selected calibration may also be employed, for example through use of default setpoint that is automatically selected if the user does not modify the setpoint within a specified time.

The particular zero point for the sensed object (e.g., the user's head) is thus adjustable via the resetting/calibration function. One user, for example, might prefer to be closer to the display monitor than another, or might prefer that relative movements be measured from a starting head position that is tilted forward slightly (i.e., pitch rotation). This is but one of many potential examples.

Figure 10:
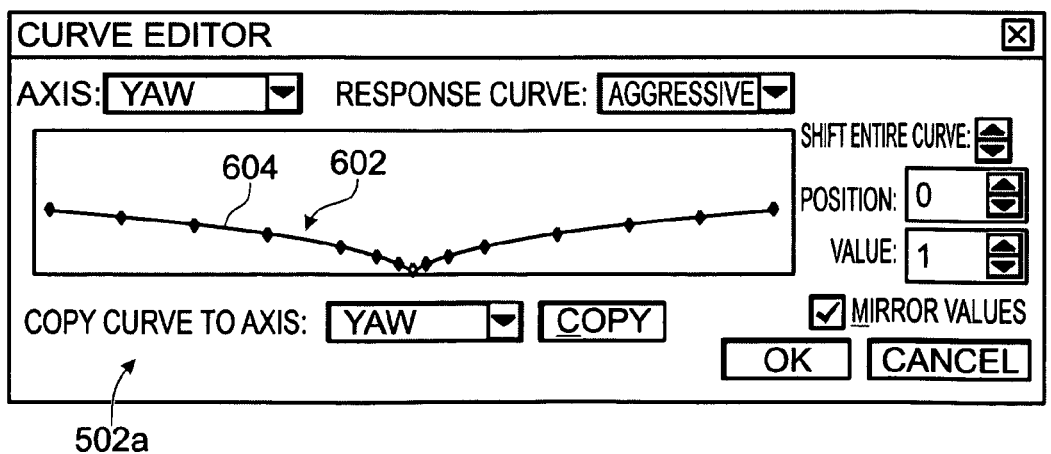

Referring now to FIG. 10, a more detailed view of motion plot 502a is depicted for yaw rotation. Motion plot 502a may be provided with various features enabling the user to adjust/vary the relationship between physical movement (i.e., yaw motion of the user's head or other sensed object) and control of the computer. As in the previous examples, manual manipulation of the actual and virtual indicators may be employed to adjust the control behavior. Alternatively, a characteristic profile may be created by the user, or the user may select from one or more pre-existing profiles. The following is a list of exemplary profiles:

1. Virtual Yaw Rotation (VYR)=α·Actual Yaw Rotation (AYR), where α is a constant;
2. VYR=(α·AYR)+β, where α and β are constants;
3. VYR=α·AYR$^n$, where α and n are constants;
4. Any of examples, 1, 2 or 3, but with one or more dead spot regions;
5. Any of examples, 1, 2, 3 or 4, but with further control effects that vary with position, velocity and/or acceleration of the sensed object;
6. etc.

It should be understood that the above list is exemplary only, and that an almost limitless number of possibilities may be employed. Furthermore, a changeable template characteristic may be displayed, allowing the user to manipulate the characteristic with a mouse or through some other input mechanism. For example, a template characteristic may, as with exemplary characteristic 602, have a plurality of reference points 604 that may be manipulated or adjusted by the user in order to produce desired changes to the control profile. Furthermore, a pulldown menu or other method of enabling the user to choose from a plurality of stored profiles, such as "aggressive, linear, etc.", may be provided.

Referring now to FIGS. 7A-7D, it may be desirable that the control effects produced by a given movement or position of the sensed object be varied in response to certain conditions. As a first example, in a six-degrees-of-freedom system, it may be desirable to vary the translational frame of reference (i.e., the orientation of the X, Y and Z axes) in response to changes in rotational position of the sensed object. This example may be illustrated in the context of the flight simulator examples discussed with reference to FIGS. 7A-7D.

In the present example, a translational movement is correlated with a virtual movement according to a translational frame of reference. In other words, a rectilinear frame of reference is used so that actual movement in direction A1 produces a virtual movement in direction V1, actual movement in direction A2 produces virtual movement in direction V2, and so on. The initial translation frame of reference is indicated on the left side of FIG. 7A and is as follows: (1) X axis: horizontal translational movements of actual head 304 left to right in a plane that is parallel to the plane of display 308; (2) Y axis: vertical translational movements of actual head 304 up and down in a plane that is parallel to the plane of display 308 (the Y-axis is not visible in the frame of reference legend due to the depiction being a top view); and (3) Z axis: movements in and out relative to display 308 in a direction orthogonal to the plane of display 308. In FIG. 7B, the virtual frame of reference is similar, but in relation to instrument panel 320. Thus when the user moves their head closer to display 308, the displayed view of instrument panel 320 and out through windshield 314 is zoomed or magnified. When the user moves their head left to right (X axis) or up and down (Y axis), the view of the instrument panel and windshield displayed on display 308 pans accordingly.

Assume now, as in FIG. 7C, that the user has turned their head to the left by 12 degrees, and that the virtual movement is amplified so as to provide a virtual view out through the left side cockpit window 316. Thus, at this point, the scene displayed on monitor 308 is a view out through the left side window. Assume now that the user wished to get a closer view out through the window, or a closer view at an instrument or other thing disposed on the left side of cockpit 312. If the translational frame of reference remains the same as prior to the rotation, the user would have to move their head from right to left (X axis translation using the original frame of reference) to get a closer displayed view of the left side of the cockpit. In some settings, this may be undesirable or counterintuitive. Accordingly, the system may be configured so that the translational frame of reference varies with rotational position of the sensed object and/or rotational position/orientation of the virtual reality scene depicted on display 308. According to one example, the translation frame of reference is continuously and dynamically varied so that whenever the user moves their actual head closer to display 308, the resulting virtual translation causes the specific scene displayed on display 308 to be zoomed or enlarged. It should be understood, however, that frames of reference for both rotational and translational motion may be varied in many different ways in response to various types of motion for the sensed object and/or the virtual depicted scene.

It will be appreciated that the embodiments and method implementations disclosed herein are exemplary in nature, and that these specific examples are not to be considered in a limiting sense, because numerous variations are possible. The subject matter of the present disclosure includes all novel and nonobvious combinations and subcombinations of the various intake configurations and method implementations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of controlling operation of a computer, comprising:
   sensing an actual position of a head of a user;
   producing, in a rendered scene of a program running on the computer, a virtual position in response to the actual position of the head of the user;
   producing, in the rendered scene, a virtual movement in response to a change in the actual position of the head of the user;
   simultaneously displaying an actual indicator visually representative of the head of the user and corresponding to the actual position of, and moving with, the head of the user and a virtual indicator visually representative of the head of the user and corresponding to the virtual position, and moving with the head of the user, the actual indicator and the virtual indicator being manipulable via user input to adjust a run-time scaling correlation between physical motion of the actual position and resulting control of the virtual position;
   during a configuration mode, receiving user input manually adjusting a position of the actual indicator of the head of the user relative to a position of the virtual indicator of the head of the user and/or the position of the virtual indicator relative to the position of the actual indicator; and
   adjusting the run-time scaling correlation between the virtual position and the actual position in response to adjustment of the position of the actual indicator and/or the position of the virtual indicator via the user input.

2. The method of claim 1, where producing a virtual movement in the rendered scene includes translating the rendered scene in response to a translational movement of the head of the user.

3. The method of claim 2, wherein the user input includes a translation of the position of the actual indicator and/or the virtual indicator.

4. The method of claim 1, where producing a virtual movement in the rendered scene includes rotating the rendered scene in response to a rotational movement of the head of the user.

5. The method of claim 4, wherein the user input includes a rotation of the position of the actual indicator and/or the virtual indicator.

6. A system for controlling operation of a computer, comprising:
   a position sensing apparatus to sense an actual position of a sensed object and produce positional data based on the actual position of the sensed object;
   engine software operatively coupled with the position sensing apparatus to output control commands based on the positional data, the control commands being operable to produce, in a software application running on the computer, a virtual position in response to the actual position of the sensed object, the control commands being further operable to produce a virtual motion in response to a change in the actual position of the sensed object; and
   a visual comparator generated by the engine software to display an actual indicator visually representative of the sensed object and depicting the actual position of, and moving with, the sensed object and a virtual indicator visually representative of the sensed object and depicting the virtual position of, and moving with, the sensed object, the actual indicator and the virtual indicator being manipulable via user input to adjust a run-time scaling correlation between physical motion of the actual position and resulting control of the virtual position, the engine software being configured to during a configuration mode, receive user input that manually adjusts a position of the actual indicator relative to a position of the virtual indicator and/or the position of the virtual indicator relative to the position of the actual indicator, and adjust the run-time scaling correlation between the virtual position and the actual position in response to adjustment of the position of the actual indicator and/or the position of the virtual indicator via the user input.

7. The system of claim 6, where the sensed object is a portion of a user's body.

8. The system of claim 7, where the portion of the user's body is a user's head.

9. The system of claim 8, where the engine software provides control commands that, when the user's head is in a first rotational position for a selected translational movement of the user's head, produce a virtual motion in a virtual direction that is different than that produced for the selected translational movement when the user's head is in a second rotational position.

10. The system of claim 8, where the actual position of the user's head is used to control presentation of a rendered virtual reality scene to the user.

11. The system of claim 10, where the position sensing apparatus and engine software cause the rendered virtual reality scene to be translated in response to a translation of the user's head.

12. The system of claim 11, wherein the user input includes a translation of the position of the actual indicator and/or the virtual indicator.

13. The system of claim 10, where the position sensing apparatus and engine software cause the rendered virtual reality scene to be rotated in response to a rotation of the user's head.

14. The system of claim 13, wherein the user input includes a rotation of the position of the actual indicator and/or the virtual indicator.

15. The method of claim 1, where the actual position of the head of the user is sensed relative to a neutral position, the method further comprising:
providing a user-operable reset to enable user adjustment of the neutral position from which the actual position of the head of the user is sensed.

16. The method of claim 1, where the actual position of the head of the user is sensed relative to a neutral position, the method further comprising:
adjusting the neutral position automatically in real time based on the actual position of the head of the user during a calibration period.

17. The method of claim 1, where the virtual movement correlates non-linearly with the change in the actual position of the head of the user.

18. The method of claim 1, further comprising:
producing, in the rendered scene, no virtual movement in response to the change in the actual position of the head of the user in at least one predetermined region.

19. The method of claim 5, wherein the user input includes separate adjustments of how much the rendered scene is rotated for each of three different perpendicular axes of rotation of the rotational movement of the head of the user to adjust the correspondence.

20. The system of claim 14, wherein the user input includes separate adjustments of how much the rendered virtual reality scene is rotated in response to a rotation of the head of the user for each of three different perpendicular axes of rotation.

21. The system of claim 6, where the virtual motion correlates non-linearly with the change in the actual position of the sensed object over a predetermined range of actual motion of the sensed object.

22. The system of claim 6, where the control commands produce at least one range of actual rotation of the sensed object that yields no corresponding change in rotation of the virtual position.

23. The system of claim 6, where the position sensing apparatus senses the actual position of the sensed object relative to a neutral position of the sensed object, and where the engine software provides a resetting function to enable resetting of the neutral position.

24. The system of claim 23, where the resetting function provides a user-operable reset to enable user resetting of the neutral position.

25. The system of claim 23, where the resetting function provides an automatic resetting of the neutral position in real time during a calibration period.

26. A system for controlling operation of a computer, comprising:
engine software to output control commands based on positional data received from an optical position sensing apparatus, the positional data representative of an actual position of a sensed object as optically sensed by the optical position sensing apparatus relative to a neutral position, the control commands being operable to produce, in a software application running on the computer, a virtual position in response to the actual position of the sensed object, the control commands being further operable to produce a virtual motion in response to a change in the actual position of the sensed object relative to the neutral position, the engine software providing a resetting function to enable real time resetting of the neutral position at any time via user input;
a visual comparator generated by the engine software to display an actual indicator visually representative of the sensed object and corresponding to the actual position of, and moving with, the sensed object and a virtual indicator visually representative of the sensed object and corresponding to the virtual position of, and moving with, the sensed object, the actual indicator and the virtual indicator being manipulable via user input to adjust a run-time scaling correlation between physical motion of the actual position and resulting control of the virtual position, the engine software being configured to, during a configuration mode, receive user input that manually adjusts a position of the actual indicator relative to a position of the virtual indicator and/or the position of the virtual indicator relative to the position of the actual indicator, and adjust the run-time scaling correlation between the virtual position and the actual position in response to adjustment of the position of the actual indicator and/or the position of the virtual indicator via the user input.

27. The system of claim 26, where the resetting function provides a user-operable real time reset to enable user resetting of the neutral position.

28. The system of claim 26, where the resetting function provides an automatic real time resetting of the neutral position during a calibration period.

29. The system of claim 26, where the virtual motion correlates non-linearly with the change in the actual position of the sensed object over a predetermined range of actual motion of the sensed object.

* * * * *